(12) United States Patent
Kawase

(10) Patent No.: US 7,437,621 B2
(45) Date of Patent: Oct. 14, 2008

(54) RACK MANAGEMENT SYSTEM, MANAGEMENT TERMINAL, CONFIGURATION RETAINING APPARATUS AND RACK APPARATUS

(75) Inventor: Hiroaki Kawase, Suginami-ku (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 11/329,380

(22) Filed: Jan. 11, 2006

(65) Prior Publication Data

US 2006/0190768 A1 Aug. 24, 2006

Related U.S. Application Data

(63) Continuation of application No. PCT/JP03/08850, filed on Jul. 11, 2003.

(51) Int. Cl.
G06F 11/00 (2006.01)
(52) U.S. Cl. .......................................... 714/47; 718/100
(58) Field of Classification Search ..................... 714/3, 714/7, 31, 43, 47, 57; 710/301–304; 713/1
See application file for complete search history.

(56) References Cited

U.S. PATENT DOCUMENTS

| | | | |
|---|---|---|---|
| 5,689,416 A | 11/1997 | Shimizu et al. | |
| 6,826,036 B2 * | 11/2004 | Pereira | 361/624 |
| 6,881,078 B1 * | 4/2005 | Chong et al. | 439/78 |
| 6,919,816 B2 | 7/2005 | Dearborn et al. | |
| 7,051,215 B2 * | 5/2006 | Zimmer et al. | 713/300 |
| 7,215,535 B2 * | 5/2007 | Pereira | 361/624 |
| 7,216,150 B2 * | 5/2007 | Chong et al. | 709/217 |
| 2003/0105904 A1 * | 6/2003 | Abbondanzio et al. | 710/302 |
| 2004/0078503 A1 * | 4/2004 | Zaudtke et al. | 710/72 |
| 2004/0255171 A1 * | 12/2004 | Zimmer et al. | 713/300 |
| 2006/0161395 A1 * | 7/2006 | Beam et al. | 702/185 |

FOREIGN PATENT DOCUMENTS

| | | |
|---|---|---|
| GB | 2379058 A | 2/2003 |
| JP | 59-49251 | 4/1984 |
| JP | 59-49251 U | 4/1984 |
| JP | 2-220148 | 9/1990 |
| JP | 3-105432 | 5/1991 |
| JP | 4-222032 | 8/1992 |
| JP | 6-28222 | 2/1994 |
| JP | 8-22403 A | 1/1996 |
| JP | 2971984 | 8/1999 |
| JP | 2000-244156 | 9/2000 |
| JP | 2001-290609 | 10/2001 |
| JP | 2002-14880 | 1/2002 |

(Continued)

OTHER PUBLICATIONS

Office Action dated Sep. 26, 2006 issued in corresponding Japanese Application No. 2005-503862.

*Primary Examiner*—Dieu-Minh Le
(74) *Attorney, Agent, or Firm*—Westerman, Hattori, Daniels & Adrian, LLP.

(57) ABSTRACT

In order to rapidly specify a failed apparatus in such an environment at a data center that handles a large number of electronic devices exemplified by servers with ease so that maintainability can be improved, when each configuration retaining apparatus receives information concerning an apparatus specified by a management terminal, a configuration retaining apparatus displaying controller displays the information concerning the specified apparatus on the configuration retaining apparatus monitor.

22 Claims, 4 Drawing Sheets

FOREIGN PATENT DOCUMENTS

| | | |
|---|---|---|
| JP | 2002-244886 | 8/2002 |
| JP | 2002-319082 | 10/2002 |
| JP | 2003-23681 | 1/2003 |
| JP | 2003-50882 | 2/2003 |
| JP | 2003-58282 A | 2/2003 |

* cited by examiner

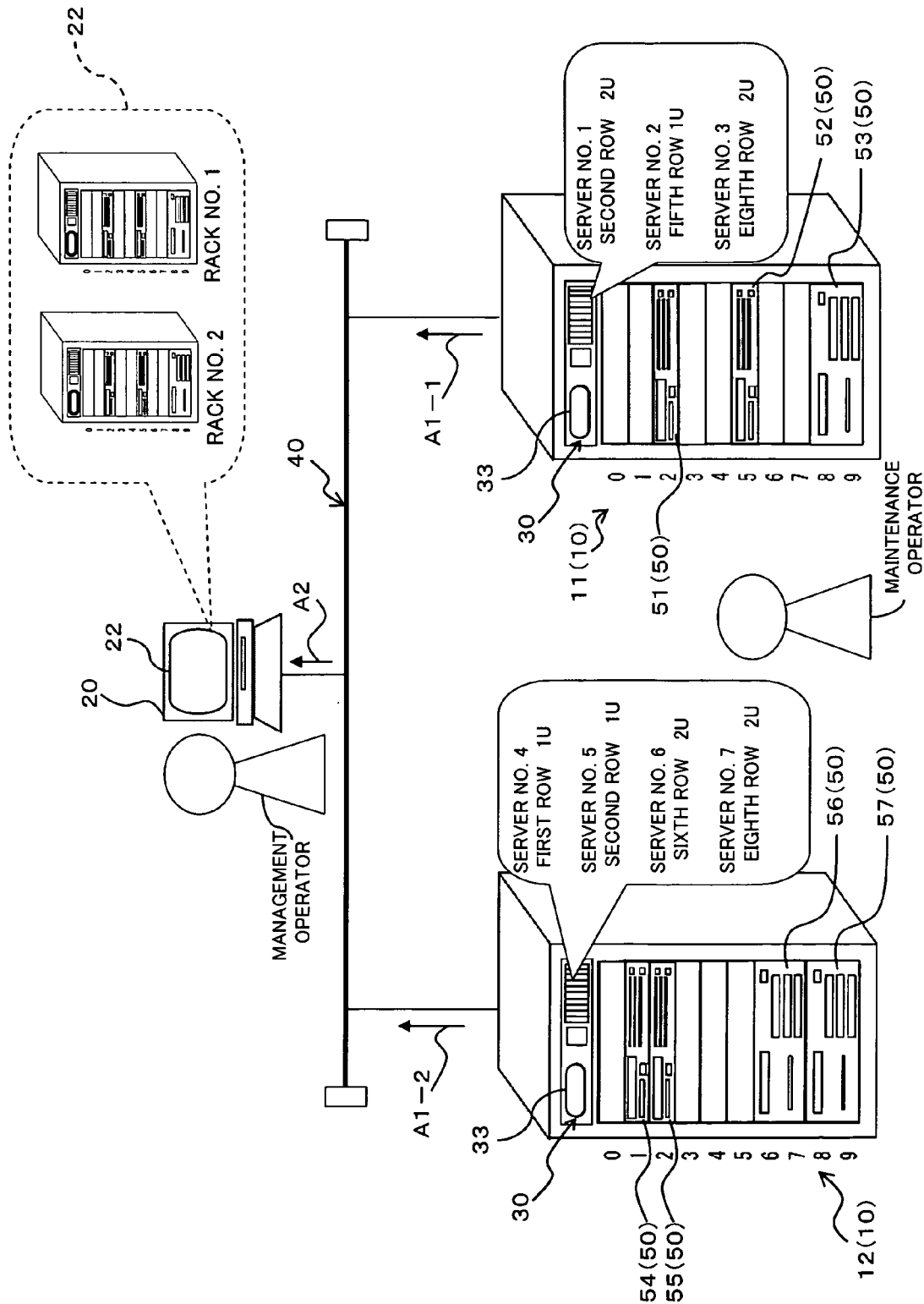

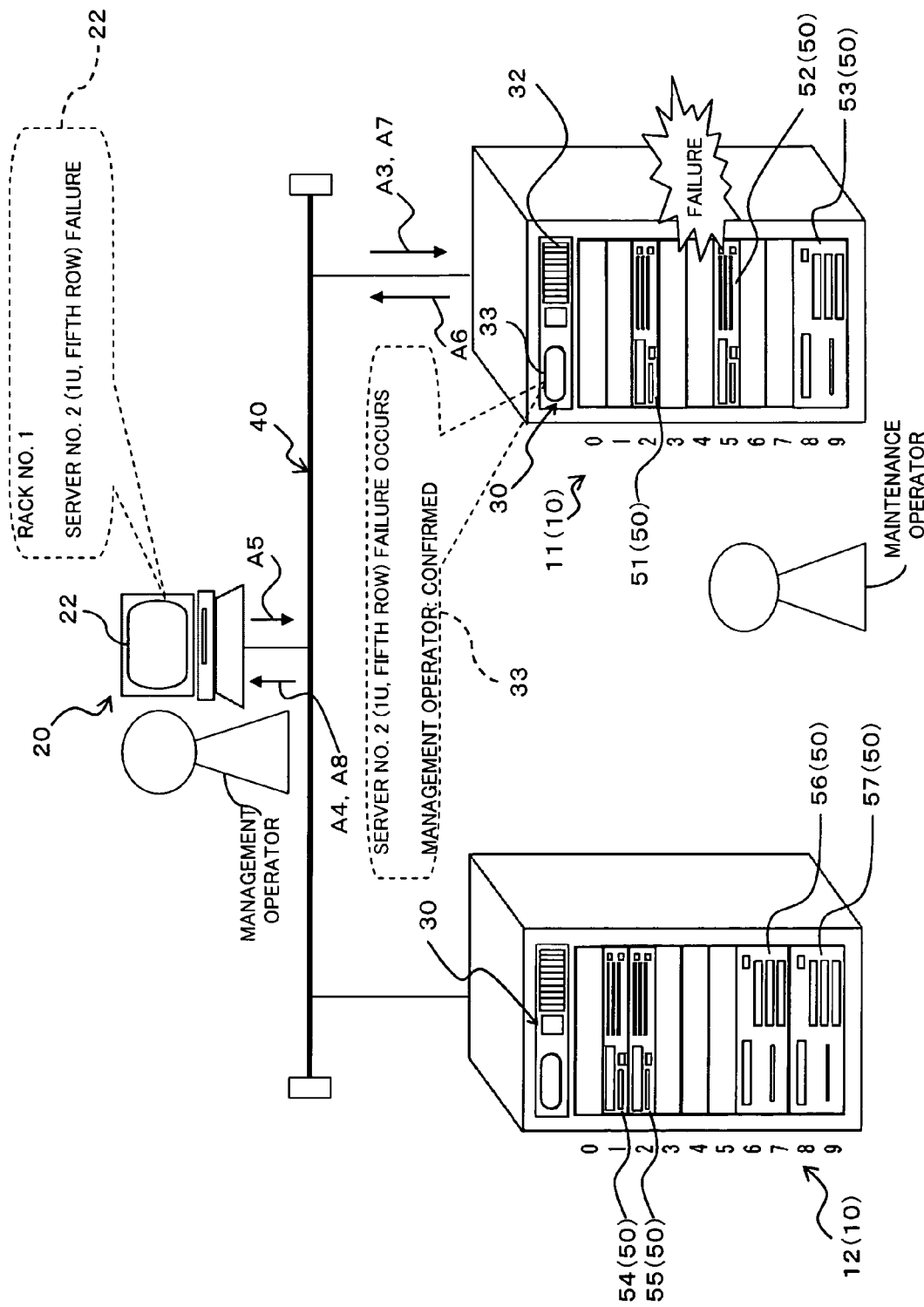

RACK MANAGEMENT SYSTEM, MANAGEMENT TERMINAL, CONFIGURATION RETAINING APPARATUS AND RACK APPARATUS

This application is a continuation of international application PCT/JP2003/008850 filed on Jul. 11, 2003.

BACKGROUND OF THE INVENTION

1. Field of the Invention

The present invention relates to a rack management system for managing electronic devices, such as servers and network devices, accommodated in a number of racks, a management terminal, a configuration retaining apparatus, and a rack apparatus to be used for accommodating these servers and electronic devices.

2. Description of the Related Art

In a general data center that uses a large number of electronic devices, such as servers and network devices, the electronic devices are accommodated in a number of racks to carry out operation. In such an environment, racks are usually disposed remotely from the management terminal. When a server (electronic device) accommodated in a rack breaks down, the manager of electronic devices can specify the broken server with reference to the management terminal, but a maintenance operator at the site where the racks are disposed can not easily do so. Therefore, in order to specify the broken devices, the maintenance operator has to contact the manager to acquire information about the broken device or has to check electronic devices accommodated in many racks.

A general 19-inch rack for servers has been designed in accordance with the standard for electronic devices determined by ANSI/EIA (American National Standards Institute/Electronic Industries Alliance). The standard fixes the width and the height of a unit chassis for a device such as a server to be 19 inches (about 482.6 mm) and a multiple of 1.75 inches (about 44.45 mm) and determines the minimum height unit of 1.75 inches to be "1 U (unit)". Design that conforms to these standards creates servers having various thicknesses from a thin one with 1 U height to a large one that occupies a space of several units. A 19-inch rack accommodates a number of servers different in thickness (height).

In usual practice, for a number of servers accommodated in the above racks, a management terminal is equipped in order to manage operation state of each of the servers. As mentioned above, in such an environment as a data center that handles a large number of servers, a management terminal is frequently disposed remotely from racks. In a system using the above racks, a failed server has conventionally been specified in the following steps (1) and (2).

(1) When a failure occurs in a server, information about the server is sent to the management terminal. The sent information is generally the name and/or the IP (Internet Protocol) address of the server.

(2) The management operator and the maintenance operator previously retain information that each server is accommodated in which position of which rack and information of the name (or IP address) of each server which are correlated with each other, and refer to the server name (or the IP address) that the management terminal is notified in the above step (1) to be displayed on the management terminal. Finally, on the basis of the server name and the previously retained information, the position of the server that needs repairing is specified.

(2') Some systems retain information about the accommodation position of each server in the management terminal. In such systems, the management terminal specifies and displays the failed server in step (2) based on the notified server name (or the IP address) and the retained information concerning the accommodation position, so that the manager and the maintenance operator can confirm the position of the failed server by referring to the management terminal.

However, in the above conventional specifying manner, unless the management terminal is disposed near to a rack that accommodates the failed server, it is difficult for the maintenance operator that is to repair the failed server to grasp in which position in which rack the failed server is accommodated because the maintenance operator cannot specify the failed server simply by referring to racks. As a solution the maintenance operator has to contact the manager performing management in a remote place to obtain information about the failed server. Such a system has been problematically inconvenient.

With the foregoing problems in view, the object of the present invention is to provide a system, used in an environment which handles a large number of electronic devices (apparatuses) such as servers, that is able to rapidly specify a failed server with ease, thereby improving maintainability.

The following Patent references 1 and 2 individually disclose techniques of a rack which accommodates substrates. Specifically, Patent reference 1 discloses a technique that automatically adjusts a rack interval of a substrate accommodation magazine to fit each substrate, and discloses a memory in which substrate information is recorded and a substrate information management section for reading the substrate information from and writing the substrate information to the memory. Patent reference 2 discloses a rack which accommodates configuration elements, such as a substrate, which form a body apparatus of a PC (Personal Computer) and a remote monitoring center for monitoring states of the elements. Even if technologies of Patent references 1 and 2 are applied to a system including a large number of servers exemplified above (in this case, regarding each server as a substrate), these techniques only have to take the same measurement as that mentioned above in an event of failure occurrence in a server (substrate) and therefore the above problems cannot be solved.

Patent reference 1: Japanese Patent No. 2971984

Patent reference 2: Japanese Patent Application Laid-Open (KOKAI) Publication No. 2000-244156

DISCLOSURE OF INVENTION

In order to attain the above object, as the first generic feature, there is provided a rack management system comprising: a plurality of racks, each for accommodating two or more apparatuses; a management terminal for managing operation states of the apparatuses accommodated in the plural racks; a plurality of configuration retaining apparatuses, corresponding one to each of the plural racks, each of which is for retaining configuration information of the apparatuses accommodated in the corresponding rack; and a communication network for exchanging information between the management terminal and the plural configuration retaining apparatuses, wherein the management terminal includes a management terminal communication section for communicating with each of the plural configuration retaining apparatuses through the communication network, a management terminal monitor for displaying information concerning the operation states of the apparatuses accommodated in the plural racks which information is to be referred to by a management operator, and a management terminal displaying controller for controlling a displaying state of the management terminal monitor, each of the configuration retaining apparatuses includes a configuration retaining apparatus communication section for communicating with the management terminal through the communication network, a configuration retaining apparatus monitor for displaying information concerning the operation states of the apparatuses accommodated in the corresponding rack which information is to be referred to by a maintenance operator, and a configuration retaining apparatus displaying controller for controlling a displaying state of the configuration retaining apparatus monitor; and in the management terminal, when the management terminal communication section receives failure information from one of the apparatuses through the communication network, the one apparatus that has issued the failure information is specified based on the failure information and the management terminal communication section sends information concerning the specified apparatus to one of the plural configuration retaining apparatuses corresponding to one of the plural racks that accommodates the specified apparatus, and in each of the configuration retaining apparatuses, if the configuration retaining apparatus communication section receives the information concerning the specified apparatus through the communication network, the configuration retaining apparatus displaying controller displays the information concerning the specified apparatus on the configuration retaining apparatus monitor.

As the second generic feature, there is provided a management terminal, communicably connected to a plurality of configuration retaining apparatuses, which correspond one to each of a plurality of racks and each of which is for retaining configuration information of apparatuses accommodated in the corresponding rack, through a communication network, for managing operation states of the apparatuses accommodated in the plural racks, comprising: a communication section for communicating with each of the plural configuration retaining apparatuses through the communication network; a monitor for displaying information concerning the operation states of the apparatuses accommodated in the plural racks which information is to be referred to by a management operator; and a displaying controller for controlling a displaying state of the monitor, wherein when the communication section receives failure information from one of the apparatuses through the communication network, the one apparatus that has issued the failure information is specified based on the failure information, and the communication section sends information concerning the specified apparatus to one of the plural configuration retaining apparatuses corresponding to one of the plural racks that accommodates the specified apparatus in order to display the information concerning the specified apparatus on the corresponding configuration retaining apparatus.

As the third generic feature, there is provided a configuration retaining apparatus, which is communicably connected to a management terminal that manages operation states of apparatuses accommodated in a plurality of racks through a communication network and which is dedicated to one of the plural racks, for retaining configuration information concerning apparatuses accommodated in the one rack, comprising: a communication section for communicating with the management terminal through the communication network; a monitor for displaying information concerning operation states of the apparatuses accommodated in the one rack which information is to be referred to by a maintenance operator; and a displaying controller for controlling a displaying state of the monitor, wherein when the communication section receives information concerning an apparatus that has been specified to be an apparatus which has issued failure information by the management terminal through the communication network, the displaying controller displays the information concerning the specified apparatus on the monitor.

As the fourth generic feature, there is provided a rack apparatus for accommodating two or more apparatuses comprising a configuration retaining apparatus for retaining configuration information of the rack apparatus, wherein; the configuration retaining apparatus includes a communication section for communicating with a management terminal which is for managing operation states of the apparatuses through a communication network, a monitor for displaying information concerning the operation states of the apparatuses accommodated in the rack apparatus which information is to be referred to by a maintenance operator, and a displaying controller for controlling a displaying state of the monitor; and when the communication section receives information concerning an apparatus that has been specified to be an apparatus which has issued failure information by the management terminal through the communication network, the displaying controller displays the information concerning the specified apparatus on the monitor.

In the rack management system, the management terminal, the configuration retaining apparatus and the rack apparatus of the present invention above mentioned, since information concerning the failed apparatus is sent from the management terminal to the corresponding configuration retaining apparatus via the communication terminal and is displayed on the corresponding configuration retaining apparatus, the maintenance operator rapidly specifies the failed apparatus with ease only with reference to the display on the corresponding configuration retaining apparatus without contacting with the management operator. This greatly improves maintainability.

Since, if the management operator confirms the failed apparatus with reference to the management terminal, the fact that the management operator has confirmed the failed apparatus is sent from the management terminal to the corresponding configuration retaining terminal through the communication network, the maintenance operator can confirm that the management operator has confirmed the failed apparatus before staring repair and maintenance, so that repair and maintenance can be carried out safely.

Since, if the maintenance operator confirms the failed apparatus with reference to the corresponding configuration retaining apparatus, the fact that the maintenance operator has confirmed the failed apparatus is sent from the corresponding configuration retaining apparatus to the management terminal through the communication network, the management operator can confirm that the fact that the maintenance operator has confirmed the failed apparatus (in other words, confirms that the maintenance operator is about to start repairing and maintenance, or has completed repairing and maintenance) and maintainability is therefore improved.

Since the configuration information of the accommodation positions and the sizes of apparatuses accommodated in each rack is sent from the corresponding configuration retaining apparatus to the management terminal through the communication network, the management terminal can display an image representing an accommodating state of apparatuses of each rack based on the received configuration information. As a consequence, in an environment exemplified by a data center that deals with a large number of apparatuses (electronic devices) such as servers, since an accommodation state of the apparatuses accommodated in a number of racks are displayed in the form of images on the management terminal, the management operator can easily grasp the accommodating state.

Especially, since when an apparatus breaks down, the management terminal displays information concerning the failed apparatus or emphasizes the failed apparatus in the image, the management operator can obtain information of the accommodation position of the failed apparatus in the form of image in addition to text information, the management operator can surely grasp the accommodation position of the failed apparatus accurately and immediately, so that the failed apparatus can be easily and quickly specified.

Further, if a configuration retaining apparatus serves as one of the apparatuses accommodated in a rack, there is no need to newly create a special rack provided with a configuration retaining apparatus whereupon an existing rack can be used for the present invention without being modified and the rack management system of the present invention can be realized with ease at low cost.

Other objects and further features of the present invention will be apparent from the following detailed description when read in conjunction with the accompanying drawings.

BRIEF DESCRIPTION OF THE DRAWINGS

FIGS. 3 and 4 are diagrams respectively showing operations performed in the rack management system of FIG. 1.

DESCRIPTION OF THE PREFERRED EMBODIMENTS

A preferred embodiment of the present invention will now be described with reference to the accompanying drawings.

Figure 1:
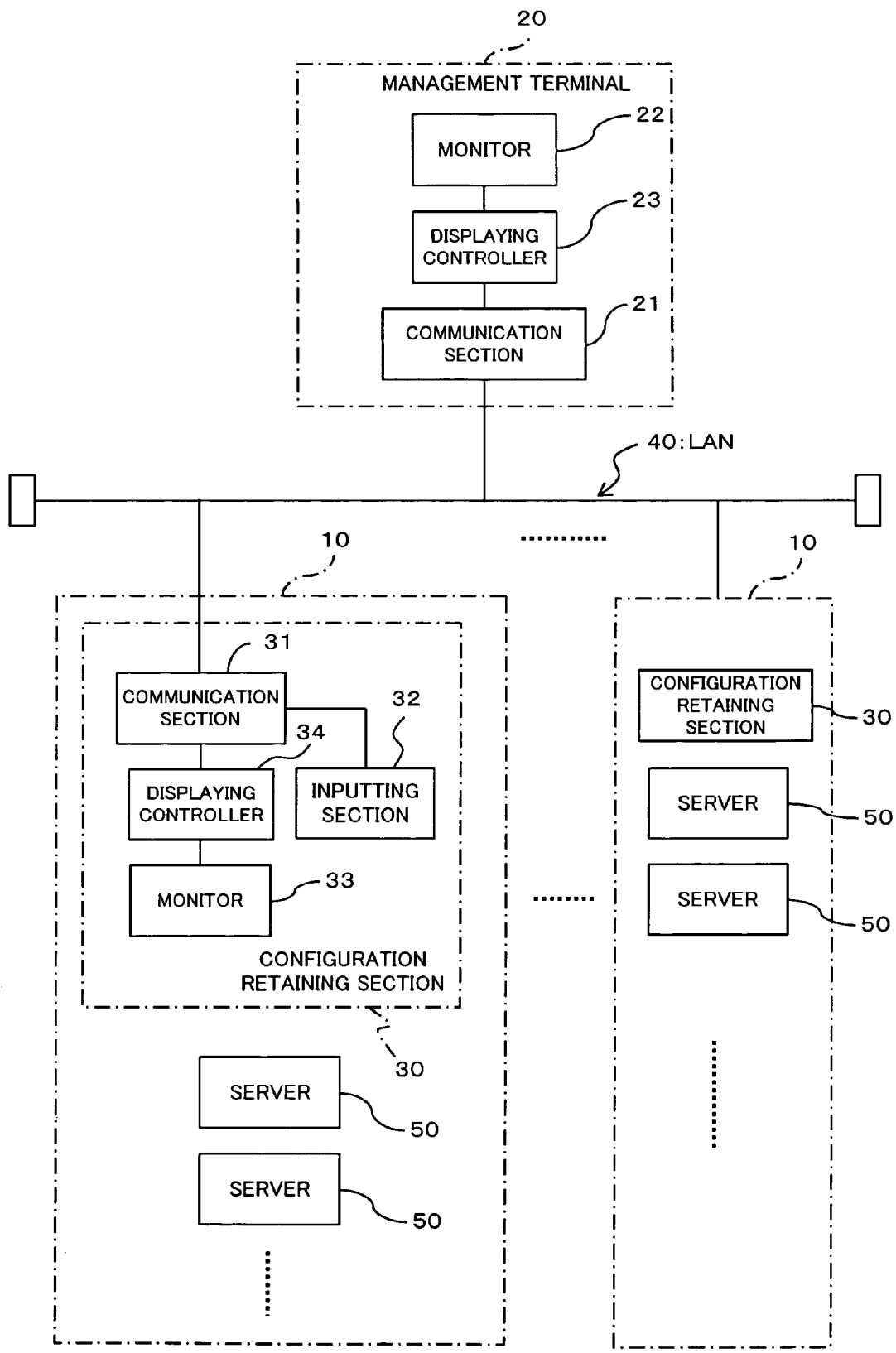
FIG. 1 is a block diagram schematically showing a functional configuration of a rack management system according to an embodiment of the present invention.

(1) Configuration of a Preferred Embodiment:

As shown in FIG. 1, a rack management system according to the present embodiment comprises a number of racks 10, a management terminal 20, a number of configuration retaining apparatuses 30 provided one for each of the racks 10, and a LAN (Local Area Network) 40.

Figure 2:
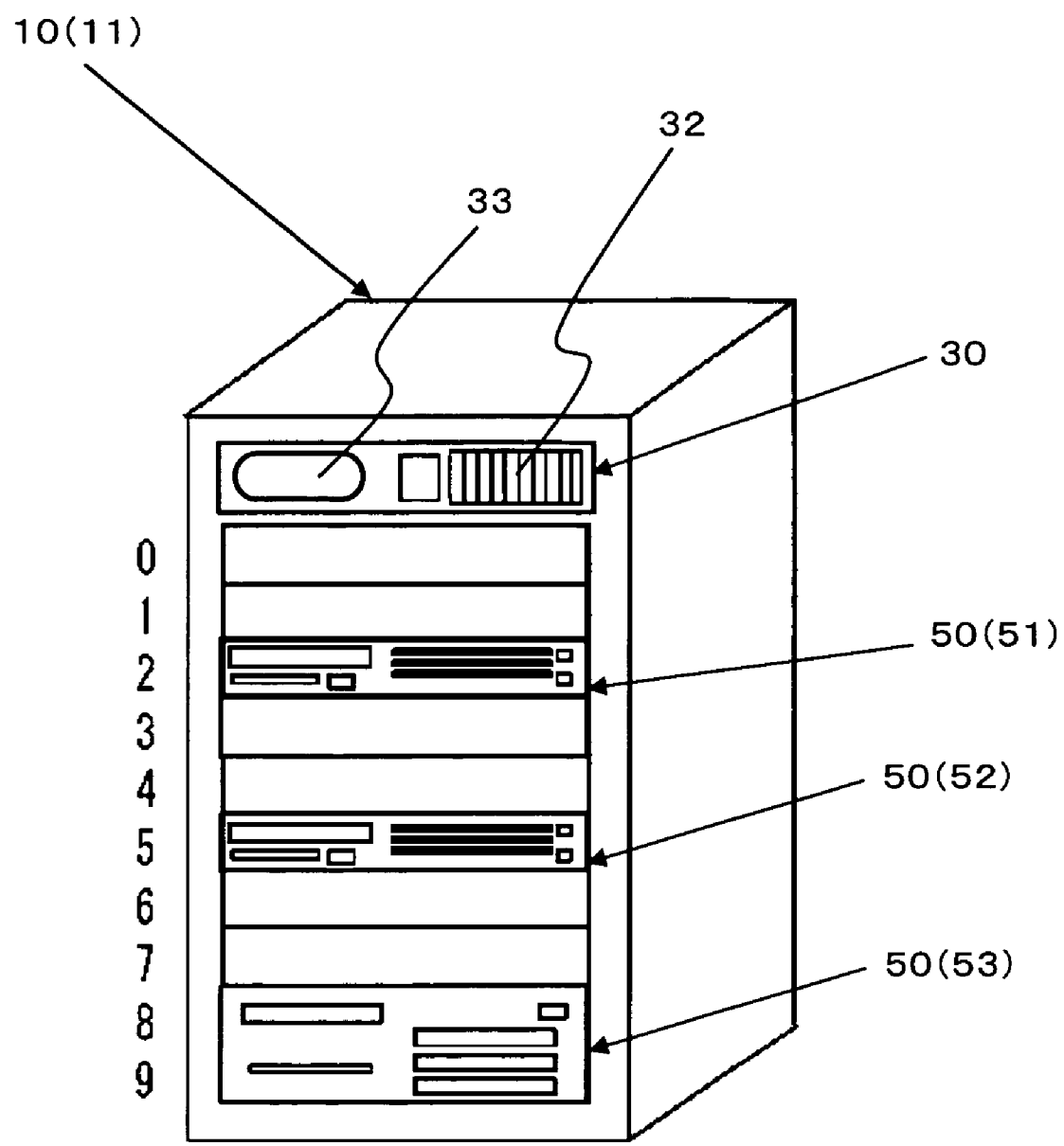
FIG. 2 is a perspective view schematically showing a rack apparatus in the rack management system of FIG. 1.

Here, each rack (rack apparatus) 10 can accommodate two or more apparatuses (electronic devices) and takes the form of a 19-inch rack that can accommodate up to ten 1 U servers 50 as shown in FIG. 2. Further as shown in FIG. 2, configuration retaining apparatus 30 is placed at the top of the case of each rack 10. As mentioned above, a rack 10 of the present embodiment has ten rows that are capable of accommodating ten 1 U servers 50. For easily specifying an accommodation position of each server 50 in a rack 10 with reference to numerical data, the rows in each rack are designated as the 0th row, the first row, the second row, . . . , and the ninth row from the top. A rack 10 can accommodate a server 50 of 2 U or larger and therefore accommodates five 2 U servers 50 at maximum. For example, the rack 10 shown in FIG. 2 accommodates two 1 U servers 50 (51, 52) on the second and the fifth rows and a 2 U server 50 (53) on the eighth row through the ninth row.

The management terminal 20 takes the form of an information processor such as an ordinary personal computer and concentratedly manages an operation state of each of servers 50 accommodated in the racks 10. The configuration retaining apparatuses 30 are provided one for each of the racks 10 as described above, and retain configuration information (to be detailed below) of each server 50 accommodated in the corresponding rack 10. Further, the LAN 40 is a communication network for exchanging information between the management terminal 20 and each configuration retaining apparatus 30.

The management terminal 20 includes a communication section 21 for communicating with each configuration retaining apparatus 30 through the LAN 40, a monitor 22 for displaying information concerning an operation state of each server 10 accommodated in each rack 10 which information is to be referred to by the management operator, and displaying controller 23 for controlling a displaying state of the monitor 22. As the communication section 21, a communication interface provided in a personal computer is used, for example. In addition, a liquid crystal display or a CRT (Cathode Ray Tube) of a personal computer is used as the monitor 22; and a CPU (Central Processing Unit) of a personal computer is used as the displaying controller 23, for example.

In the management terminal 20, the communication section 21 and the displaying controller 23 carry out the following processes (1-1) to (1-5).

(1-1) On the basis of configuration information (to be detailed below) received in the communication section 21 from each configuration retaining apparatus 30, the displaying controller 23 displays an image (see FIGS. 2 and 3, for example) representing an accommodating state of servers 50 in each rack 10 on the monitor 22.

(1-2) When the communication section 21 receives failure information through the LAN 40, the above-mentioned CPU or others specifies the server 50 that has issued the failure information based on the failure information, and the displaying controller 23 displays information (accommodation position information) concerning the specified server 50 (hereinafter, sometimes called the failed server 50) on the monitor 22 and at the same time emphasizes the failed server 50 in the image displayed on the monitor 22 by highlighting, flashing or the like.

(1-3) The communication section 21 sends information concerning the failed server 50 to a configuration retaining apparatus 30 corresponding to a rack which accommodates the failed server 50 through the LAN 40.

(1-4) When the management operator confirms the failed server 50 with reference to the monitor 22, the communication section 21 sends management operator confirmation information which concretely indicates a fact (a message) notifying that the management operator has confirmed the failed server 50 to the configuration retaining apparatus 30 corresponding to the rack which accommodates the failed server 50 through the LAN 40.

(1-5) When the communication section 21 receives maintenance operator confirmation information (to be described below, see process (2-4)) through the LAN 40, the displaying controller 23 displays the maintenance operator confirmation information on the monitor 22.

Each configuration retaining apparatus 30 includes a communication section 31 for communicating with the management terminal 20 through the LAN 40, an inputting section 32 for inputting configuration information (to be described below) of servers 50 accommodated in the corresponding rack, a monitor 33 for displaying information concerning operation states of the servers 50 accommodated in the corresponding rack which information is to be referred to by the maintenance operator, and a displaying controller 34 for controlling a displaying state of the monitor 33.

Configuration information of the servers 50 accommodated in a rack 10 is input from the inputting section 32 when the maintenance operator operates the inputting section 32. Configuration information includes names (server numbers) of servers 50 accommodated in the corresponding rack, accommodation positions (numerical data indicating rack rows on which the servers 50 are accommodated) of the servers 50 and the sizes of the servers 50 (numerical data in the form of U (units) indicating the thickness of each server 50, in other words numerical data indicating the height that each server 50 occupies in the rack 10), which are correlated with one another. For example as shown in FIG. 2, if a 2 U server 50 is accommodated so as to occupy the eighth and the ninth rows, numerical data representing the accommodation position and the size of the server 50 that are to be input are "8" and "2", respectively.

In each configuration retaining apparatus 30 of the present embodiment, the communication section 31 and the displaying controller 34 carry out the following processes (2-1) to (2-4).

(2-1) The communication section 31 sends configuration information that has been input from the inputting section 32 along with a rack number that specifies the corresponding rack to the management terminal 20 through the LAN 40.

(2-2) When the communication section 31 receives information concerning the failed server 50 through the LAN 40, the displaying controller 34 displays the information concerning the failed server 50 on the monitor 33.

(2-3) When the communication section 31 receives the management operator confirmation information (see an above process (1-4) )through the LAN 40, the displaying controller 34 displays the management operator confirmation information on the monitor 33.

(2-4) When the maintenance operator confirms the failed server 50 with reference to the monitor 33, the communication section 31 sends the fact (message), as maintenance operator confirmation information, which indicates that the maintenance operator has confirmed the failed server 50 to the management terminal 20 through the LAN 40.

As mentioned above, a server number peculiar to each server 50 accommodated in a rack 10, numerical data indicating an accommodation position of the server 50 and numerical data indicating the thickness of the server 50 are sent along with a rack number peculiar to each rack (that accommodates the server 50) to the management terminal 20 from each configuration retaining apparatus 30. On the basis of the above information that has been sent from each configuration retaining apparatus 30, the displaying controller 23 of the management terminal 20 can create an image representing an accommodating state of servers 50 in each rack 10 (e.g., three-dimensional images as shown in FIGS. 2 and 3) and display the images on the monitor 22.

The above functions of the displaying controller 23 in the management terminal 20 and those of the displaying controller 34 of each configuration retaining apparatus 30 are exemplified by a CPU executing one or more predetermined application programs. These application programs are stored in a computer-readable recording medium such as a flexible disk, a CD-ROM, a CD-R, a CD-RW, or a DVD. In this case, a computer (a CPU) reads the programs from the recording medium, and transfers and stores the read programs into an internal or external memory for further use. Alternatively, these programs may be stored in a storage device (a recording medium) such as a magnetic disk, an optical disk, or a magneto-optic disk and may be provided to a computer (CPU) from the storage device through a communication line. Besides a flexible disk, a CD-ROM, a CD-R, a CD-RW, a DVD, a magnetic disk, an optical disk, and a magneto-optic disk, a storage medium used in the present embodiment may be various media as long as they can be read from a computer and therefore can be exemplified by an IC card, a ROM cartridge, a magnetic tape, a punch card, an internal memory (such as a RAM or a ROM) in a computer, an external memory, or a printed matter on which codes such as bar codes are printed.

(2) Operation of the Present Embodiment:

Next, operation performed in the rack management system according to the present embodiment mentioned above will now be detailed with reference to FIGS. 3 and 4. A system shown in FIGS. 3 and 4 is assumed to have two racks 10. Rack 11 (10) with rack number 1 accommodates two 1 U servers 51 and 52 (50) with server numbers 1 and 2 on the second and the fifth rows and a 2 U server 53 (50) with a server number 3 that occupies the eighth and the ninth rows. In rack 12 (10) with a rack number 2, two 1 U servers 54 and 55 (50) with server numbers 4 and 5 are placed on the first and the second rows respectively, and a 2 U server 56 (50) with a server number 6 that occupies the sixth and the seventh rows and a 2 server 57 (50) with a server number 7 that occupies the eighth and the ninth rows are placed.

In such a system, when the servers 50 (51-57) are to be accommodated in the racks 10 (11 and 12), the maintenance operator or the like inputs information (configuration information) of the servers 50 accommodated in each rack 10 into the corresponding configuration retaining apparatus 30. Operation on the inputting section 32 by the maintenance operator or the like inputs the name (the server number) of each server 50 accommodated in a rack 10, numeric data representing the accommodating position of the server 50, and numeric data representing the thickness (the occupying height) of the server 50 being correlated with one another.

Specifically, in the system shown in FIG. 3, configuration information of "server number: 1, accommodation position: second row, and occupying height: 1 U" is input for server 51 accommodated in rack 11; configuration information of "server number: 2, accommodation position: fifth row, and occupying height: 1 U" is input for server 52 accommodated in rack 11; configuration information of "server number: 3, accommodation position: eighth row, and occupying height: 2 U" is input for server 53 accommodated in rack 11; configuration information of "server number: 4, accommodation position: first row, and occupying height: 1 U" is input for server 54 accommodated in rack 12; configuration information of "server number: 5, accommodation position: second row, and occupying height: 1 U" is input for server 55 accommodated in rack 12; configuration information of "server number: 6, accommodation position: second row, and occupying height: 2 U" is input for server 56 accommodated in rack 12; and configuration information of "server number: 7, accommodation position: eighth row, and occupying height: 2 U" is input for server 57 accommodated in rack 12.

As described above, configuration information concerning each rack 10 (11 or 12) input from the inputting section 32 is retained in the corresponding configuration retaining apparatus 30 and is sent along with the rack number to specify the rack 10 (11 or 12) to the management terminal 20 through the LAN 40 (see arrows A1-1, A1-2 in FIG. 3).

If the management terminal 20 receives configuration information of each rack 10 (11 or 12) (see arrow A2 in FIG. 3) from a configuration retaining apparatus 30 corresponding to the rack 10, the management terminal 20 can display an image visually representing an accommodating state of servers 50 (51-57) in each rack 10 (11 or 12). In the present embodiment, the displaying controller 23 of the management terminal 20 creates images (e.g., in three dimensions) corresponding one to each of the accommodation states of servers 50 in the racks 11 and 12, and displays the created images along with the rack numbers on the monitor 22 of the management terminal 20 as shown at the upper part of FIG. 3. The management terminal 20 (the communication section 21) collects and receives information (e.g., abnormal/normal state information) concerning an operation state of each server 50, and the information is correlated with the corresponding image of the server 50 (51-57) by the displaying controller 23 and displayed on the monitor 22. That makes it possible for the management operator to immediately and visually grasp which server accommodated in which rack is in what operation state simply by referring the monitor 22.

For example, as shown in FIG. 4, if server 52 accommodated in rack 11 breaks down, the server (also called the failed server) 52 sends failure information to the management terminal 20 through the LAN 40 (see arrow A3 in FIG. 4). Upon receipt of the failure information at the management terminal 20 (the communication section 21) (see arrow A4 in FIG. 4), the management terminal 20 specifies the failed server 52 based on the configuration information that is already sent from the configuration retaining apparatuses 30 and the failure information. Specifically, the management terminal 20 specifies that the server 52, which is accommodated in rack 11 with rack number 1 and which has server number 2 (1 U, on the fifth row), has broken down.

Accommodation position information of the failed server 52 that has been specified in the above manner is displayed in the form of text data "rack No.: 1, server No.: 2 (1 U, fifth row) failure" on the monitor 22 as shown at the upper part in FIG. 4. At the same time, the displaying controller 23 emphasizes the specified failed server 52 in the image displayed as shown at the upper part of FIG. 3 by highlighting, flashing or other manner. With reference to the monitor 22, the management operator immediately confirms the position of the server 52 that broke down.

Further, the communication section 21 sends the accommodation position information of the failed server 52 to the configuration retaining apparatus 30 corresponding to the rack 11 that accommodates the failed server 52 through the LAN 40 (see arrow A5 in FIG. 4). When the communication section 31 of the corresponding configuration retaining apparatus 30 receives the accommodation position information of the failed server 52 (see arrow A6 in FIG. 4), the displaying controller 34 displays the accommodation position information in the form of text data "server number: 2 (1 U, fifth row) failure" as shown in the middle part of FIG. 4 on the monitor 33.

When the management operator confirms the failed server 52 with reference to the monitor 22 of the management terminal 20 and carries out a confirmation operation on the management terminal 20, a fact (a message) notifying that the management operator has confirmed the failed server 52 is sent, as management operator confirmation information, from the communication section 21 to configuration retaining apparatus 30 that is provided for the rack 11 which accommodates the failed serve 52 through the LAN 40 (see arrow A5 FIG. 4). After that, when the communication section 31 of the configuration retaining apparatus 30 receives the management operator confirmation information (see arrow A6 in FIG. 4), the displaying controller 34 displays the management operator confirmation information in the text data "management operator: confirmed" on the monitor 33 as shown in the middle part of FIG. 4.

Consequently, the maintenance operator can grasp failure occurrence in the server 52 accommodated in the rack 11 and the accommodation position of the server 52 by referring to the monitor 33 of the configuration retaining apparatus 30 corresponding to the rack 11. In addition, the maintenance operator can confirm whether or not the management operator has confirmed the failure of the server 52 before carrying out repairs.

Meanwhile, when the maintenance operator confirms the failed server 52 with reference to the monitor 33 of the configuration retaining apparatus 30 and carries out a confirmation operation on the configuration retaining apparatus 30 (the inputting section 32), the communication section 31 sends the fact (the message) notifying that the maintenance operator has confirmed the failed server 52 as maintenance operator confirmation information to the management terminal 20 through the LAN 40 (see arrow A7 in FIG. 4). The communication section 21 of the management terminal 20 receives the maintenance operator confirmation information (see arrow A8 in FIG. 4), the maintenance operator confirmation information is displayed in the form of text data (exemplified by "maintenance operator: confirmed") on the monitor 22 by the displaying controller 23.

The timing at which the maintenance operator carries out a confirmation operation on a configuration retaining apparatus 30 may be immediately after the maintenance operator has confirmed the failed server 52 by referring the monitor 33 (immediately before the maintenance operator starts repairs or maintenance) or may be after completion of repairs or maintenance.

(3) Advantages of the Present Embodiment:

The above-mentioned rack management system of the present invention ensures the following advantages.

(3-1) Since configuration information of servers 50 accommodated in each rack 10 is sent from a corresponding configuration retaining apparatus 30 to the management terminal 20 through the LAN 40, the management terminal 20 can display an image representing an accommodating state of the servers 50 in each rack 10 based on the received configuration information. With this configuration, an environment, such as a data center, that handles a large number of apparatuses (electronic devices) can display an image identical to actual configuration representing states of apparatuses (servers 50) accommodated in a number of racks 10, so that the management operator can grasp the states of the servers 50 with ease by referring to the monitor 22 of the management terminal 20.

(3-2) If a failure occurs in a server 50, the management terminal 20 displays text information concerning the accommodation position of the failed server 50 or emphasizes the failed server in an image displayed on the monitor 22. Since an image representing the accommodation position of the failed server 50 is provided to the management operator in addition to the text information of the position, the management operator can accurately and quickly grasp the accommodation position of the failed server 50 for rapid and easy specifying of the failed server 50.

(3-3) Since information concerning the failed server 50 is sent from the management terminal 20 to the configuration retaining apparatus 30 provided for the rack 10 that accommodates the failed server 50 through LAN 40 and the information is displayed on the corresponding configuration retaining apparatus 30, a maintenance operator rapidly specifies the failed server 50 with ease only by referring the monitor 33 of the configuration retaining apparatus 30 without contacting with the maintenance operator or without operating the management terminal 20 even if the management terminal 20 is not near. As a result, maintainability can be greatly improved.

(3-4) Since, when the management operator confirms the failed server 50 with reference to the management terminal 20, the fact (the message) notifying that the management operator has confirmed the failed server 50 is sent from the management terminal 20 to the configuration retaining apparatus 30 provided for the rack 10 that accommodates the failed server 50 through the LAN 40 and is displayed on the configuration retaining apparatus 30, the maintenance operator can confirm that the management operator has confirmed failure occurrence before starting repairing and maintenance, so that repairing and maintenance can be carried out safely.

(3-5) Since, when the maintenance operator confirms the failed server 50 with reference to the configuration retaining apparatus 30, the fact (the message)notifying that the maintenance operator has confirmed the failed server 50 is sent from the configuration retaining apparatus 30 to the management terminal 20 through the LAN 40 and is displayed on the management terminal 20, the maintenance operator can confirm that the maintenance operator has confirmed the failed server 50 (i.e., that the maintenance operator is about to start repairs or maintenance or that repairs and maintenance has been completed), so that maintainability can be further improved.

(4) Others:

The present invention should by no means be limited to the foregoing embodiment, and various changes or modifications may be suggested without departing from the gist of the invention.

For example, in the foregoing embodiment, a configuration retaining apparatus 30 is installed on the top of the corresponding rack 10, but alternatively may be created in the form of an apparatus whose case size is identical to a 1 U server so that a configuration retaining apparatus 30 can be accommodated as one of servers in the existing rack 10. In this case, a special rack apparatus equipped with a configuration retaining apparatus 30 need not be newly made and the rack management system of the present invention can be realized by an existing rack with ease at low cost.

Further, the rack management system described in the above embodiment has two racks 10, each of which is a 19-inch rack that can accommodate ten 1 U servers 50 at maximum, but should by no means be limited to the rack number and type.

INDUSTRIAL APPLICABILITY

As mentioned above, the present invention can send information concerning failed apparatus from the management terminal to a configuration retaining apparatus through the communication network and display on the configuration retaining apparatus in an environment, such as a data center, that handles a large number of apparatuses. The maintenance operator can rapidly specify the failed apparatus with ease simply by referring to the display on the configuration retaining apparatus without contacting with the management operator, so that maintainability can be further improved.

As a result, the present invention is preferably applied to a rack management system for a data center that uses a large number of electronic devices such as servers and network devices, and has extremely high usage.

What is claimed is:

1. A rack management system comprising:

a plurality of racks, each for accommodating two or more apparatuses;

a management terminal for managing operation states of the apparatuses accommodated in the plural racks;

a plurality of configuration retaining apparatuses, corresponding one to each of said plural racks, each of which is for retaining configuration information of the apparatuses accommodated in the corresponding rack; and a communication network for exchanging information between said management terminal and the plural configuration retaining apparatuses, wherein said management terminal includes a management terminal communication section for communicating with each of said plural configuration retaining apparatuses through said communication network, a management terminal monitor for displaying information concerning the operation states of the apparatuses accommodated in said plural racks which information is to be referred to by a management operator, and a management terminal displaying controller for controlling a displaying state of said management terminal monitor, each said configuration retaining apparatus includes a configuration retaining apparatus communication section for communicating with said management terminal through said communication network, a configuration retaining apparatus monitor for displaying information concerning the operation states of the apparatuses accommodated in the corresponding rack which information is to be referred to by a maintenance operator, and a configuration retaining apparatus displaying controller for controlling a displaying state of said configuration retaining apparatus monitor; and in said management terminal, when said management terminal communication section receives failure information from one of the apparatuses through said communication network, the one apparatus that has issued the failure information is specified based on the failure information and said management terminal communication section sends information concerning the specified apparatus to one of said plural configuration retaining apparatuses corresponding to one of said plural racks that accommodates the specified apparatus, and in each said configuration retaining apparatus, if said configuration retaining apparatus communication section receives the information concerning the specified apparatus through said communication network, said configuration retaining apparatus displaying controller displays the information concerning the specified apparatus on said configuration retaining apparatus monitor.

2. A rack management system according to claim 1, wherein, in said management terminal, when the management operator confirms the specified apparatus with reference to said management terminal monitor, said management terminal communication section sends each said configuration retaining apparatus, corresponding to the one rack that accommodates the specified apparatus, the fact that the management operator has confirmed the specified apparatus as management operator confirmation information through said communication network, and in each said configuration retaining apparatus, when said configuration retaining apparatus communication section receives the management operator confirmation information through said communication network, said configuration retaining apparatus displaying controller displays the management operation confirmation information on said configuration retaining apparatus monitor.

3. A rack management system according to claim 1, wherein,
in each said configuration retaining apparatus,
when the maintenance operator confirms the specified apparatus with reference to said configuration retaining apparatus monitor, said configuration retaining apparatus communication section sends said management terminal the fact that the maintenance operator has confirmed the specified apparatus as maintenance operator confirmation information through said communication network; and
in said management terminal,
when said management terminal communication section receives the maintenance operator confirmation information through said communication network, said management terminal displaying controller displays the maintenance operator confirmation information on the management terminal monitor.

4. A rack management system according to claim 1, wherein:
each said configuration retaining apparatus further includes an inputting section for inputting accommodation positions and sizes of the apparatuses accommodated in the corresponding rack as the configuration information;
in said each configuration retaining apparatus,
said configuration retaining apparatus communication section sends said management terminal the configuration information input from said inputting section through said communication network; and
in said management terminal,
said management terminal displaying controller displays an image representing an accommodating state of the apparatuses in each said rack on said management terminal monitor based on the configuration information that said management terminal communicating section has received from each said configuration retaining apparatus.

5. A rack management system according to claim 4, wherein in said management terminal, said management terminal displaying controller displays the information concerning the specified apparatus on said management terminal monitor.

6. A rack management system according to claim 5, wherein said management terminal displaying controller emphasizes the specified apparatus in the image displayed on the management terminal monitor.

7. A rack management system according to claim 1, wherein each said configuration retaining apparatus serves as one of the apparatuses accommodated in the corresponding rack.

8. A management terminal, communicably connected to a plurality of configuration retaining apparatuses, which correspond one to each of a plurality of racks and each of which is for retaining configuration information of apparatuses accommodated in the corresponding rack, through a communication network, for managing operation states of the apparatuses accommodated in the plural racks, comprising:
a communication section for communicating with each of the plural configuration retaining apparatuses through the communication network;
a monitor for displaying information concerning the operation states of the apparatuses accommodated in the plural racks which information is to be referred to by a management operator; and
a displaying controller for controlling a displaying state of said monitor, wherein
when said communication section receives failure information from one of the apparatuses through the communication network, the one apparatus that has issued the failure information is specified based on the failure information and said communication section sends information concerning the specified apparatus to one of said plural configuration retaining apparatuses corresponding to one of the plural racks that accommodates the specified apparatus in order to display the information concerning the specified apparatus on the corresponding configuration retaining apparatus.

9. A management terminal according to claim 8, wherein
when the management operator confirms the specified apparatus with reference to said monitor,
said communication section sends the configuration retaining apparatus, corresponding to the one rack that accommodates the specified apparatus, the fact that the management operator has confirmed the specified apparatus as management operator confirmation information through said communication network in order to display the management operator confirmation information on the corresponding configuration retaining apparatus.

10. A management terminal according to claim 8, wherein when said communication section receives maintenance operator confirmation information indicating that a maintenance operator has confirmed the specified apparatus with reference to the corresponding configuration retaining apparatus through the communication network, said displaying controller displays the maintenance operator confirmation information on said monitor.

11. A management terminal according to claim 8, wherein when said communication section receives configuration information including accommodation positions and sizes of the apparatuses accommodated in the each of the plural racks from the corresponding configuration retaining apparatus through the communication network, said displaying controller displays an image representing an accommodating state of the apparatuses in each of the plural racks on said monitor based on the configuration information received by said communication section.

12. A management terminal according to claim 11 wherein said displaying controller displays the information concerning the specified apparatus on said monitor.

13. A management terminal according to claim 12, wherein said displaying controller emphasizes the specified apparatus in the image displayed on said monitor.

14. A configuration retaining apparatus, which is communicably connected to a management terminal that manages operation states of apparatuses accommodated in a plurality of racks through a communication network and which is dedicated to one of the plural racks, for retaining configuration information concerning apparatuses accommodated in the one rack, comprising:
a communication section for communicating with the management terminal through the communication network;
a monitor for displaying information concerning operation states of the apparatuses accommodated in the one rack which information is to be referred to by a maintenance operator; and
a displaying controller for controlling a displaying state of said monitor, wherein
when said communication section receives information concerning an apparatus that has been specified to be an apparatus which has issued failure information by the management terminal through the communication network, said displaying controller displays the information concerning the specified apparatus on said monitor.

15. A configuration retaining apparatus according to claim 14, wherein when communication section receives management operator confirmation information which indicates that a management operator has confirmed the specified apparatus through said communication network, said displaying controller displays the management operation confirmation information on said monitor.

16. A configuration retaining apparatus according to claim 14, wherein when the maintenance operator confirms the specified apparatus with reference to said monitor, said communication section sends maintenance operator confirmation information which indicates a fact that the maintenance operator has confirmed the specified apparatus to the management terminal through the communication network in order to display the maintenance operator confirmation information on the management terminal.

17. A configuration retaining apparatus according to claim 14, further comprising an inputting section for inputting accommodation positions and sizes of the apparatuses accommodated in the one rack as the configuration information, wherein
said communication section sends the configuration information input from said inputting section to the management terminal through the communication network, so that the management terminal displays an image representing an accommodating state of the apparatus accommodated each of the plural racks.

18. A configuration retaining apparatus according to claim 14, wherein said configuration retaining apparatus serves as one of the apparatuses accommodated in the one rack.

19. A rack apparatus for accommodating two or more apparatuses comprising a configuration retaining apparatus for retaining configuration information of said rack apparatus, wherein;
said configuration retaining apparatus includes a communication section for communicating with a management terminal which is for managing operation states of the apparatuses through a communication network, a monitor for displaying information concerning the operation states of the apparatuses accommodated in said rack apparatus which information is to be referred to by a maintenance operator, and a displaying controller for controlling a displaying state of said monitor; and
when said communication section receives information concerning an apparatus that has been specified to be an apparatus which has issued failure information by said management terminal through said communication network, said displaying controller displays the information concerning the specified apparatus on said monitor.

20. A rack apparatus according to claim 19, wherein when said communication section receives management operator confirmation information which indicates that a management operator has confirmed the specified apparatus through said communication network, said displaying controller displays the management operation confirmation information on said monitor.

21. A rack apparatus according to claim 19, wherein when the maintenance operator confirms the specified apparatus with reference to said monitor, said communication section sends maintenance operator confirmation information which indicates a fact that the maintenance operator has confirmed the specified apparatus to the management terminal through the communication network in order to display the maintenance operator confirmation information on the management terminal.

22. A rack apparatus according to claim 19, further comprising an inputting section for inputting accommodation positions and sizes of the apparatuses accommodated in said rack apparatus as the configuration information, wherein
said communication section sends the configuration information input from said inputting section to the management terminal through the communication network, so that the management terminal displays an image representing an accommodating state of the apparatus accommodated in said rack apparatus.

* * * * *